United States Patent
Kowalkowski et al.

(10) Patent No.: US 9,109,480 B2
(45) Date of Patent: Aug. 18, 2015

(54) METHOD AND SYSTEM FOR INITIATING AN ENGINE AFTER-RUN STATE AND CONTROLLING A NITROGEN OXIDE SENSOR SELF-DIAGNOSTIC TOOL

(71) Applicant: GM GLOBAL TECHNOLOGY OPERATIONS LLC, Detroit, MI (US)

(72) Inventors: Janean E Kowalkowski, Northville, MI (US); John David Barta, Brighton, MI (US); Scott McLane, Farmington Hills, MI (US); Marek L. Wilmanowicz, Pinckney, MI (US); Benjamin Radke, Waterford, MI (US); Jason J Chung, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 13/688,347

(22) Filed: Nov. 29, 2012

(65) Prior Publication Data

US 2014/0144126 A1 May 29, 2014

(51) Int. Cl.
*F01N 3/00* (2006.01)
*F01N 3/02* (2006.01)
*F01N 3/10* (2006.01)
*F01N 3/20* (2006.01)
*F01N 9/00* (2006.01)
*F01N 11/00* (2006.01)

(52) U.S. Cl.
CPC .............. *F01N 9/002* (2013.01); *F01N 3/208* (2013.01); *F01N 11/00* (2013.01); *F01N 2560/026* (2013.01); *F01N 2560/14* (2013.01); *Y02T 10/24* (2013.01); *Y02T 10/47* (2013.01)

(58) Field of Classification Search
USPC ................... 60/274, 277, 286, 295, 299, 301
See application file for complete search history.

(56) References Cited

U.S. PATENT DOCUMENTS

| | | | |
|---|---|---|---|
| 2009/0151425 A1 | 6/2009 | Miwa | |
| 2010/0101215 A1* | 4/2010 | Wu et al. | 60/286 |
| 2011/0167801 A1* | 7/2011 | Massner | 60/274 |
| 2011/0185707 A1* | 8/2011 | Upadhyay et al. | 60/274 |
| 2011/0252767 A1 | 10/2011 | Lin et al. | |
| 2012/0117942 A1 | 5/2012 | Kowalkowski et al. | |
| 2012/0233984 A1 | 9/2012 | Levijoki et al. | |
| 2012/0260625 A1 | 10/2012 | Feldmann et al. | |

FOREIGN PATENT DOCUMENTS

| | | |
|---|---|---|
| DE | 102007037907 A1 | 2/2009 |
| DE | 102010038334 A1 | 1/2012 |

\* cited by examiner

*Primary Examiner* — Audrey K Bradley
*Assistant Examiner* — Dapinder Singh
(74) *Attorney, Agent, or Firm* — Quinn Law Group, PLLC

(57) ABSTRACT

A system and method for initiating an engine after-run state and controlling a nitrogen oxide sensor self-diagnostic tool are provided. The system may include an internal combustion engine, an exhaust system, a selective catalytic reduction (SCR) device and at least two NOx sensors to measure the efficiency of the SCR device and a controller or host machine. The controller, via the present method, executes a first control action to disable the self-diagnostic tool when one of an occurrence of a particulate filter regeneration event and a non-occurrence of a calibration threshold is detected. The controller executes a second control action, initiating an engine after-run state and enabling the self-diagnostic tool when one of a non-occurrence of a particulate filter regeneration event and an occurrence of the calibration threshold is detected.

17 Claims, 2 Drawing Sheets

METHOD AND SYSTEM FOR INITIATING AN ENGINE AFTER-RUN STATE AND CONTROLLING A NITROGEN OXIDE SENSOR SELF-DIAGNOSTIC TOOL

TECHNICAL FIELD

The present disclosure relates to a system and method for initiating an engine after run state and controlling the operation of a nitrogen oxide (NOx) sensor self-diagnostic tool of the type used in an engine exhaust system.

BACKGROUND

Diesel engines and, to a lesser extent, other internal combustion engines generate nitrogen oxide (NOx) gasses as byproducts of the fuel combustion process. NOx gasses may be present in an exhaust stream in various forms, including as nitric oxide (NO), nitrogen dioxide ($NO_2$), and nitrous oxide ($N_2O$). A selective catalytic reduction (SCR) device is typically used as part of a vehicle exhaust system to reduce NOx gasses before the exhaust is discharged into the atmosphere. The catalytic action of the SCR device and an associated reductant such as ammonia or urea ultimately converts NOx gasses into inert byproducts, i.e., nitrogen and water.

In vehicles having a diesel engine, NOx sensors are typically positioned upstream and downstream of the SCR device. The upstream or front NOx sensor measures NOx levels emitted by the engine, while the downstream/rear NOx sensor measures NOx levels remaining in the exhaust stream after treatment by the SCR device. Together, the front and rear NOx sensor measurements are used to calculate the overall NOx removal efficiency. Because a high degree of confidence is required in the levels of NOx gasses discharged by vehicles, certain government agencies require the calculation and recording of NOx removal efficiency. Additionally, due to the high degree of confidence required, periodic monitoring of the NOx removal system efficiency and the performance of the upstream and downstream sensors is required to ensure the overall integrity of a diesel exhaust system, as well as to comply with government agency regulations.

The accuracy of the periodic monitoring is necessary to ensure correct reporting and maintenance of the diesel exhaust system in compliance with government agency requirements. It is also important to the consumer that the monitoring produce only a valid warning or maintenance notifications.

SUMMARY

A system and method for initiating an engine after-run state and controlling a nitrogen oxide sensor self-diagnostic tool are provided. The system may be incorporated into a vehicle. The vehicle may include an internal combustion engine which generates an exhaust stream. The vehicle may further include an exhaust system. The exhaust system may include a selective catalytic reduction (SCR) device configured to catalytically convert nitrogen oxide (NOx) gasses present in the exhaust stream into water and nitrogen; and at least two NOx sensors one upstream of the SCR device and one downstream of the SCR device. Each NOx sensor may have an evaluation element, which may be configured to measure the upstream NOx level on an inlet side of the SCR device and the downstream NOx level on an outlet side of the SCR device. The exhaust system may further include a particulate filter configured to remove particulate matter from the exhaust stream and a diesel oxidation catalyst.

The system may also include a powertrain expansion bus in communication with the exhaust system; a glow plug control module which provides power to the upstream NOx sensor and the downstream NOx sensor; and a controller in electrical communication with the upstream and downstream NOx sensors.

The controller may contain a NOx sensor self-diagnostic algorithm for enabling and disabling the NOx sensor self-diagnostic tool. The algorithm is configured to enable or disable the NOx sensor self-diagnostic tool depending on the occurrence or non-occurrence of a regeneration of the particulate filter within the particular key cycle and/or sufficient amount of normal (non-regeneration) run time since a recent regeneration of the particulate filter. This avoids the number of times the NOx sensor self-diagnostic diagnostic tool is aborted and avoids a false setting for a diagnostic trouble code.

The NOx sensor self-diagnostic tool, when enabled, performs a diagnosis of the evaluation element of each of the respective NOx sensors, to determine if the evaluation element is cracked or contaminated. If the evaluation element of either of the NOx sensors is cracked or contaminated, the respective NOx sensor is incapable of performing a calculation of SCR efficiency using a comparison or delta of upstream NOx integration quantities gathered from the upstream NOx sensor and downstream NOx quantities from the downstream NOx sensor during a vehicle trip.

The present method may be beneficially used once the occurrence or non-occurrence of a particulate filter regeneration has been detected. If the algorithm detects a regeneration event within the present key/drive cycle or an insufficient amount of time has elapsed since the last regeneration event, the controller executes a first control action. The first control action includes disabling the NOx sensor self-diagnostic tool.

If the algorithm detects a non-occurrence of a regeneration event and/or a sufficient amount of normal (non-regeneration) run time has elapsed since a recent regeneration event, the controller executes a second control action. The controller further includes an engine control module configured to trigger and initiate the engine after-run state if the second control action is executed.

The second control action includes transmitting a required amount of after-run extension time to initiate the engine after-run state to a glow plug control module with the engine control module, while the engine is running and triggering the NOx sensor self-diagnostic tool to complete a diagnosis of each NOx sensor evaluation element during the engine after-run state, to determine if the SCR efficiency can be accurately evaluated during vehicle operation. The second control action then requires supplying power to the upstream NOx sensor and the downstream NOx sensor for the duration of the after-run extension time when the engine is turned off with the glow plug control module; running the NOx sensor self-diagnostic tool during the engine after-run extension time; and the NOx sensor transmitting a status and result generated by the NOx sensor self-diagnostic tool to the engine control module over a powertrain expansion bus.

The second control action may further include: reading the status and result of the NOx sensor self-diagnostic tool with the engine control module; returning one of a passing result or failing result; communicating the result to the vehicle driver, if the result is a failing result, e.g. via a dashboard indicator lamp; and ending the engine after-run state by shutting down the engine control module, the glow plug control module, and the NOx sensors when the after run extension time expires.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
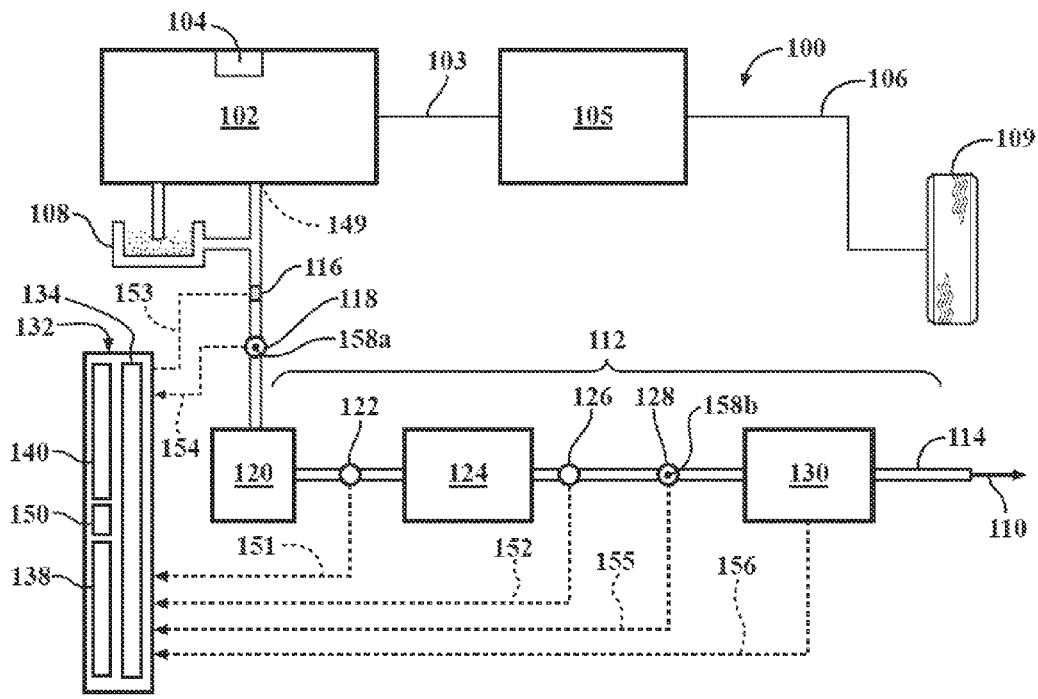
FIG. 1 is a schematic illustration of a vehicle having an exhaust system, with a controller is configured for initiating an engine after-run state to diagnose a first evaluation element of an upstream NOx sensor and a second evaluation element of a downstream NOx sensor as described herein.

Referring to the drawings, wherein like reference numerals refer to like components throughout the several figures, the vehicle 100 having an exhaust system 112 is shown in FIG. 1. The vehicle 100 includes a controller 132 that is configured to execute process instructions embodying a method having a first control action 202 and a second control action 203 shown in FIG. 3. The controller 132 may include a NOx sensor self-diagnostic algorithm 138, NOx sensor self-diagnostic tool 150, an engine control module 134, and a regeneration control module 140.

Execution of the first control action 202 allows the components of the controller 132 to, via the algorithm 138, detect whether a regeneration event has occurred during the key cycle or vehicle trip. If a regeneration has occurred, the controller 132, via the algorithm 138, will disable the NOx self-diagnostic tool 150. If a regeneration event is not detected, the execution of the second control action 203 allows the components of the controller 132 to trigger the initiate an engine after-run state in which the engine 102 is turned off and the NOx sensor self-diagnostic tool 150 may complete a diagnosis of and return a resulting output for the condition of a first evaluation element 158a of an upstream NOx sensor 118 and a second evaluation element 158b of a downstream NOx sensor 128 to determine whether efficiency of an SCR device 124 can be accurately measured during a subsequent vehicle key cycle, as described herein below.

Referring generally to FIGS. 1-4, the vehicle 100 includes an internal combustion engine 102 having an air intake 104, which generates an exhaust stream 110 e.g., a diesel engine or any other engine that emits significant levels of nitrogen oxide (NOx) gasses. While a diesel application is described hereinafter for illustrative consistency, those of ordinary skill in the art will appreciate that a similar approach may be taken with respect to other engine designs.

The vehicle 100 may further include an exhaust system 112. The exhaust system 112 may include a selective catalytic reduction (SCR) device 124 configured to catalytically convert nitrogen oxide (NOx) gasses present in the exhaust stream 110 into water and nitrogen.

As shown in FIG. 1, aboard the vehicle 100, combustion of diesel fuel drawn from a tank 108 generates the exhaust stream (arrow 110), which is then processed through the exhaust system 112 before being ultimately discharged from a tailpipe 114 into the surrounding atmosphere. Energy released by combustion of the diesel fuel produces torque on a rotatable input member 103 of a transmission 105. Input torque from the engine 102 is transferred through the various gear sets, clutches, brakes, and interconnecting members (not shown) of the transmission 105 to a rotatable output member 106. Output torque from the transmission 105 is thus delivered to a set of drive wheels 109, only one of which is shown in FIG. 1 for illustrative simplicity.

The exhaust system 112 shown schematically in FIG. 1 is in communication with an exhaust port(s) 149 of the engine 102. Depending on the embodiment, the exhaust system 112 may include an oxidation catalyst 120, a selective catalytic reduction (SCR) device 124, and a diesel particulate filter (DPF) 130 arranged in any desired order. The SCR device 124 is configured to convert NOx gasses into water and nitrogen as inert byproducts of combustion using an injection from a tank (not shown) of a suitable reductant, e.g., ammonia (NH3) or urea, and an active catalyst. For example, the SCR device 124 may be configured as a ceramic brick or a ceramic honeycomb structure, a plate structure, or any other suitable design. Collectively, the oxidation catalyst 120, the SCR device 124, and the DPF 130 provide the necessary conditioning of the exhaust stream (arrow 110). Temperature sensors 122, 126 may be positioned upstream and downstream of the SCR device 124, respectively, with respective measured temperatures (arrows 151, 152) relayed to the controller 132.

The vehicle 100 may also include a fuel injection device 116 that is in electronic communication with the controller 132, and that is controlled via a set of control signals (arrow 153) from the controller 132. The fuel injection device 116 is in communication with the tank 108. When signaled by the controller 132, the fuel injection device 116 selectively injects some of the fuel into the exhaust stream (arrow 110), e.g., upstream of or directly into the oxidation catalyst 120. The injected fuel is then burned in a controlled manner within the oxidation catalyst 120 to generate heat at levels sufficient for regenerating the particulate filter 130. Regeneration event outputs (arrow 156) are fed into the controller at a regeneration control module 140.

The NOx sensor 118 is positioned upstream with respect to the SCR device 124, such as at the outlet of the engine 102. Thus, the NOx sensor 118 is referred to hereinafter as the upstream NOx sensor 118. The NOx sensor 128 is positioned downstream with respect to the SCR device 124, for instance just before the DPF 130. Thus, the NOx sensor 128 is referred to hereinafter as the downstream NOx sensor 128. Structurally and functionally, the NOx sensors 118 and 128 may be otherwise identical. Each NOx sensor 118, 128 may include an evaluation element 158a, 158b. The upstream NOx sensor 118 having a first evaluation element 158a, and the downstream NOx sensor having a second evaluation element 158b, which return and feed NOx level measurements (arrows 154, 155) from the respective upstream and downstream NOx sensors 118 and 128 into the controller 132, particularly into an engine control module (ECM) 134.

Figure 2:
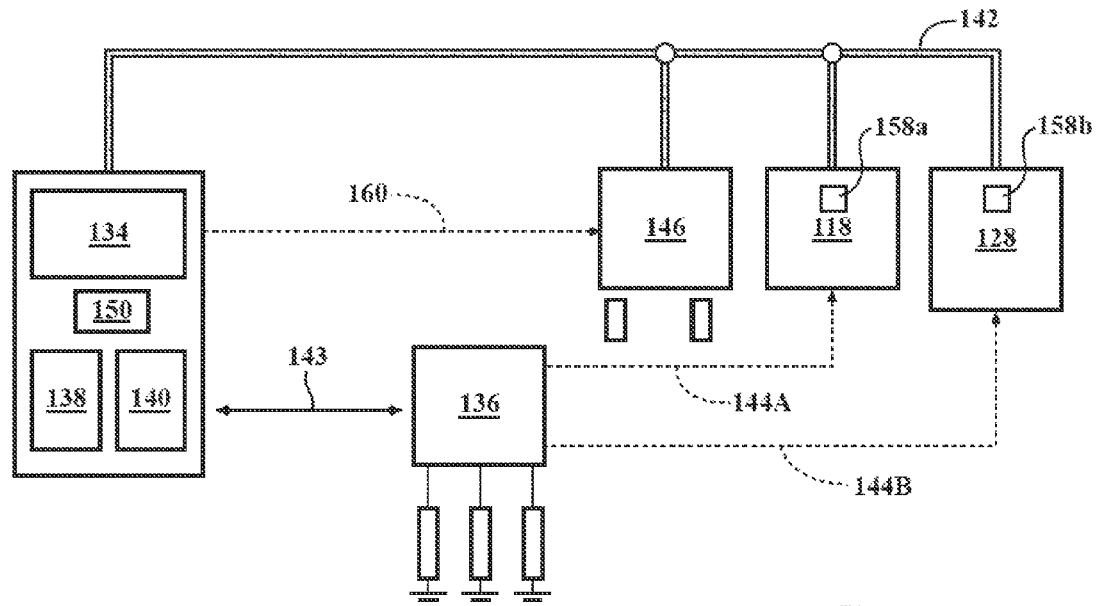
FIG. 2 is a schematic illustration of the componentry necessary to effectuate the engine after-run state.

Referring to FIG. 2, the vehicle 100 may also include a powertrain expansion bus 142 in communication with the exhaust system 112; a glow plug control module 136, which provides power to the upstream NOx sensor 118 and the downstream NOx sensor 128; and a level temperature evaluation module 146 configured to communicate the temperature and fluid level of the diesel exhaust fluid tank 108 to the engine control module 134 over the powertrain expansion bus 142. The powertrain expansion bus 142 is a serial data Controller Area Network (CAN) communication bus that exchanges information using a scheduled periodic rate.

The controller 132 may be embodied as a host machine or distributed system, e.g., a digital computer or microcomputer, acting as a vehicle control module, and/or as a proportional-integral-derivative (PID) controller device having a processor, and tangible, non-transitory memory such as read-only memory (ROM) or flash memory. The controller 132 may also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. The controller 132 may include an engine control module (ECM) 134, a regeneration control module 140, a NOx sensor self-diagnostic tool 150, and a NOx sensor diagnostic algorithm 138. The algorithm 138 and any required reference calibrations may be stored within or readily accessed by the controller 132 to provide the required functions described below.

The controller 132 contains the NOx sensor self-diagnostic algorithm 138, which is capable of enabling or disabling the NOx sensor self-diagnostic tool 150, depending on the occurrence or non-occurrence of a regeneration of the particulate filter 130 within the particular key cycle and/or elapse of a sufficient amount of normal run time since a recent regeneration of the particulate filter 130, according to the present method. Regeneration events are typically fairly seldom occurring approximately once every 400-500 miles driven. After a regeneration event, the exhaust system 112 is not stable enough to allow the NOx sensor self-diagnostic tool 150 to diagnose whether the evaluation element 158a, 158b of each of the NOx sensors 118, 128 is cracked or contaminated due to the volatility of exhaust gas oxygen content following the injection of hydrocarbon into the exhaust stream 110 during the regeneration event. If the NOx sensor self-diagnostic tool 150 runs directly after a regeneration event, it often aborts. For example, if the amount of $O_2$ in the exhaust stream is greater than 0.1% then the NOx sensor self-diagnostic tool 150 often aborts to avoid the production of unreliable or erroneous results, warnings, or maintenance notifications.

The NOx sensor self-diagnostic tool 150, when enabled, performs a diagnosis of the evaluation element 158a, 158b of each of the NOx sensors 118, 128, to determine if the respective evaluation element 158a, 158b is cracked or contaminated. If the evaluation element 158a, 158b of either of the NOx sensors 118, 128 is cracked or contaminated, the respective NOx sensor 118, 128 is incapable of performing a calculation of SCR efficiency using a comparison or delta of upstream NOx integration quantities gathered from the upstream NOx sensor 118 and downstream NOx quantities from the downstream NOx sensor 128 during a vehicle trip.

In completing the diagnosis, the NOx sensor self-diagnostic tool 150 pumps oxygen into one chamber of each evaluation element 158a, 158b. The NOx sensor self-diagnostic tool 150 measures the pumping current required to pump 1000 ppm of oxygen into the chamber of the respective evaluation element 158a, 158b. If the pumping current ratio, i.e. the ratio of the current test pumping current and the original manufactured test pumping current is greater than a first specified value, the NOx sensor self-diagnostic tool 150 will return a result that the evaluation element 158a, 158b is cracked. If the pumping current is less than a second specified value then the NOx sensor self-diagnostic tool 150 will return a result that the evaluation element 158a, 158b is contaminated. Both a result that indicates the evaluation element 158a, 158b is cracked and a result that the evaluation element 158a, 158b is contaminated will be considered failing results and the SCR efficiency diagnostics, which perform a calculation of SCR device 124 efficiency using a comparison or delta of upstream NOx integration quantities gathered from the upstream NOx sensor 118 and downstream NOx quantities from the downstream NOx sensor 128, cannot be completed.

In one example, the NOx sensor self-diagnostic tool will produce a passing result if the pumping current ratio is within the range from about 70 to about 140. In such an example, the first specified value is approximately 140 and the second specified value is approximately 70.

Figure 3:
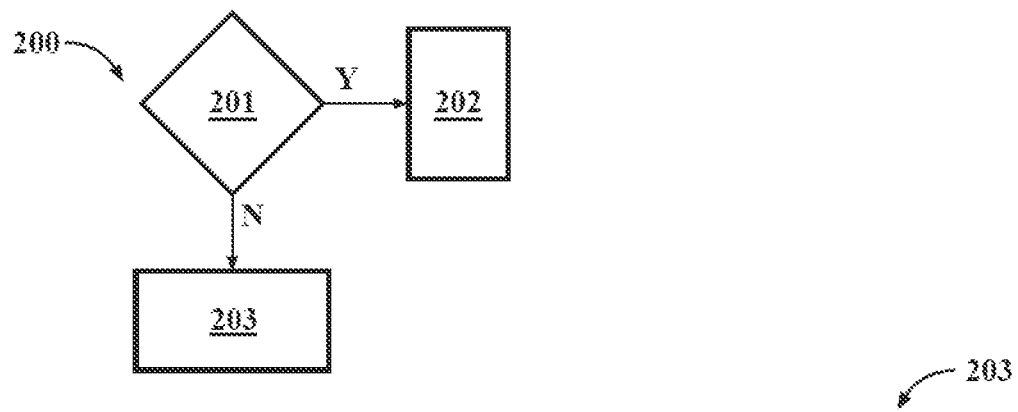
FIG. 3 is a flow chart describing a method for enabling or disabling the NOx sensor self-diagnostic tool and initiating an engine after-run state.
Figure 4:
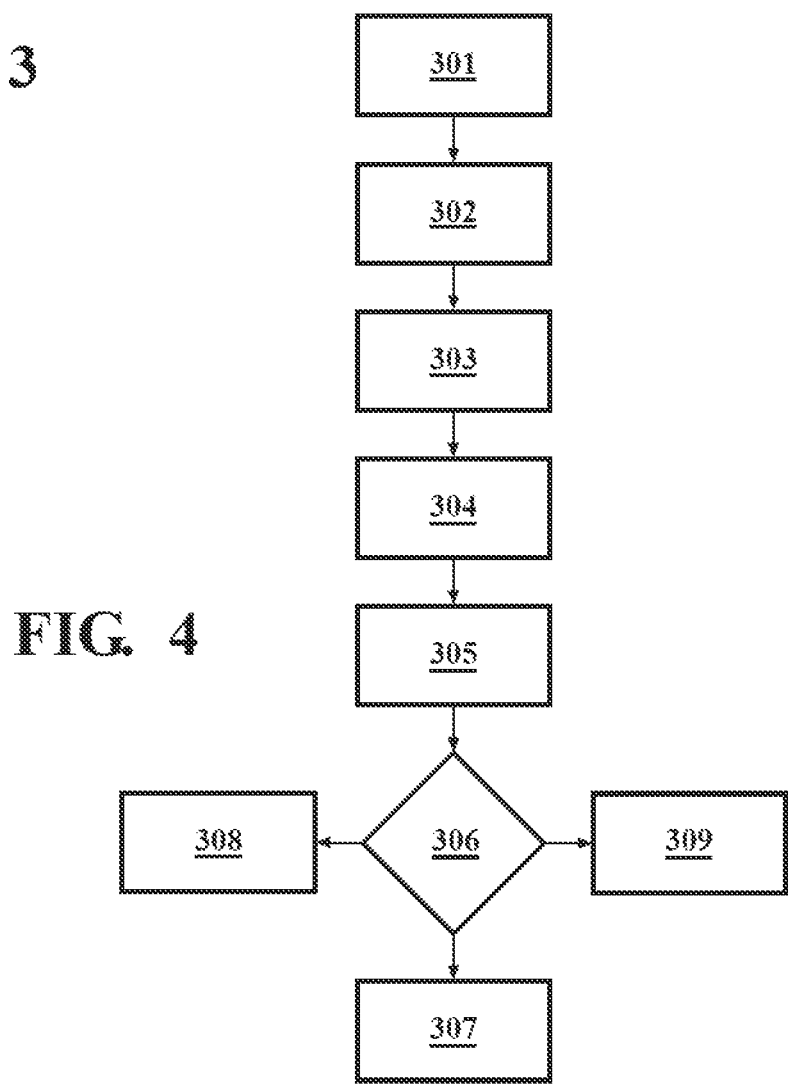
FIG. 4 is a flow chart describing a second control action wherein an engine after-run state is initiated and the condition of a first evaluation element of an upstream NOx sensor and a second evaluation element of a downstream NOx sensor is diagnosed.

Referring to FIGS. 3 and 4, in conjunction with the structure of the example vehicle 100 shown in FIGS. 1 and 2, the present method (shown in flow chart form at 200) may be beneficially used to evaluate whether the occurrence or non-occurrence of a particulate filter 130 regeneration has been detected and complete the correct subsequent first control action 202 or second control action 203.

As shown in FIG. 3, if a regeneration event is detected within the present key cycle or an insufficient amount of time has elapsed since the last regeneration event (shown at step 201) the controller 132, via the algorithm 138, executes a first control action 202. The first control action includes disabling the NOx sensor self-diagnostic tool 150. This avoids the number of times the diagnostic tool 150 is aborted and allows for more accurate readings and results from the diagnostic tool 150. Disabling the NOx sensor self-diagnostic tool 150 also avoids a false setting for a diagnostic trouble code.

If the controller 132, via the algorithm 138, detects a non-occurrence of a regeneration event and/or a sufficient amount of non-regeneration run time has elapsed since a recent regeneration event (shown at step 201), the controller executes a second control action 203.

The second control action 203 includes several steps, and is detailed by the flow chart shown in FIG. 4. After the algorithm 138 detects the non-occurrence of a regeneration event and/or a sufficient amount of non-regeneration run time has elapsed since a recent regeneration event (shown at step 201), the controller will execute a second control action 203 detailed in steps 301 to 307 in sequential order.

At step 301, the controller 132 initiates an engine after-run state and will transmit a required amount of after-run extension time required to the glow plug control module (GPCM) 136 with the engine control module (ECM) 134 via signal 143, while the engine 102 is running. The engine after-run state being defined when the engine is turned off, but power is still supplied to the exhaust system 112 and powertrain expansion bus 142 with the GPCM 136 and ECM 134. Further at step 301, the controller will simultaneously trigger the NOx sensor self-diagnostic tool 150, to complete a diagnosis of the first evaluation element 158a and the second evaluation element 158b during the engine after-run state.

At step 302, the GPCM 136 will supply power to the upstream NOx sensor 118, the downstream NOx sensor 128 for the duration of the after run extension time when the engine is turned off as shown by signal paths 144a, 144b. Simultaneously, the controller 132, via the ECM 134, will supply power to the powertrain LTE 146 shown by signal path 160.

At step 303, the controller 132 will run the NOx sensor self-diagnostic tool 150 during the engine after-run extension time to evaluate the condition of the first evaluation element 158a and the second evaluation element 158b. This is done by the NOx sensor self-diagnostic tool 150 measuring the pumping current required to pump 1000 ppm of oxygen into the chamber of the respective evaluation element 158a, 158b. If the ratio of the current test pumping current and the original manufactured test pumping current is greater than a first specified value, the NOx sensor self-diagnostic tool 150 will return a result that the evaluation element 158*a*, 158*b* is cracked. If the ratio of the current test pumping current and the original manufactured test pumping current is less than a second specified value then the NOx sensor self-diagnostic tool 150 will return a result that the evaluation element 158*a*, 158*b* is contaminated. Both a result that indicates the evaluation element 158*a*, 158*b* is cracked and a result that the evaluation element 158*a*, 158*b* is contaminated will be considered failing results.

In one example, the NOx sensor self-diagnostic tool 150 will produce a passing result if the pumping current ratio is within the range from about 70 to about 140. In such an example, the first specified value is approximately 140 and the second specified value is approximately 70.

At step 304, the upstream NOx sensor 118 and the downstream NOx sensor 128 transmit a condition of the first evaluation element 158*a* and the second evaluation element 158*b* and the result generated by the NOx sensor self-diagnostic tool 150 to the engine control module 134 over the powertrain expansion bus 142.

The second control action may also optionally include steps 305 to 307. At step 305, the ECM 134 may read the status and result of the NOx sensor self-diagnostic tool 150.

At step 306, the ECM 134 may determine and return a presently passing or presently failing result as of the end of the key cycle. If the result is passing the ECM 134 will not alert the vehicle driver (shown at step 308). However, if the result is presently failing, the ECM 134 will send a signal to alert the vehicle driver of a failing result and necessary maintenance required e.g. via a dashboard indicator lamp or the like (shown at step 309).

At step 307, the engine after-run state will end as after-run extension time indicated at step 301 expires wherein the engine control module 134, the glow plug control module 136, and the NOx sensors 118, 128, and powertrain expansion bus 142 are shut down.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
an internal combustion engine configured to generate an exhaust stream;
an exhaust system including:
a selective catalytic reduction (SCR) device configured to catalytically convert nitrogen oxide (NOx) gases present in the exhaust stream into water and nitrogen;
an upstream NOx sensor having a first evaluation element configured to measure an upstream NOx level on an inlet side of the SCR device; and
a downstream NOx sensor having a second evaluation element configured to measure a downstream NOx level on an outlet side of the SCR device;
a particulate filter configured to remove particulate matter from the exhaust stream;
a powertrain expansion bus in communication with the exhaust system;
a glow plug control module configured to provide power to the upstream NOx sensor and the downstream NOx sensor; and
a controller in communication with the upstream and downstream NOx sensors, the controller having a processor and tangible, non-transitory memory on which is recorded instructions, wherein executing the recorded instructions causes the processor to:
detect each of an occurrence of a regeneration event of the particulate filter within a vehicle key cycle and a non-occurrence of a regeneration event of the particulate filter within the vehicle key cycle;
execute a first control action when an occurrence of a regeneration event of the particulate filter is detected within the vehicle key cycle, wherein the first control action includes:
evaluating an amount of time elapsed since the occurrence of a regeneration event of the particulate filter to produce an evaluated amount of time; and
comparing the evaluated amount of time to a predetermined calibration threshold amount of time elapsed since the occurrence of a regeneration event of the particulate filter, such that when the evaluated amount of time is greater than the predetermined calibration threshold amount of time elapsed since the occurrence of a regeneration event of the particulate filter the controller initiates a second control action and when the evaluated amount of time is less than the predetermined calibration threshold amount of time elapsed since the occurrence of a regeneration event of the particulate filter the controller disables an engine after-run state; and
execute the second control action when a non-occurrence of a regeneration event of the particulate filter is detected within the vehicle key cycle, wherein the second control action includes initiating the engine after-run state.

2. The vehicle of claim 1 wherein the controller includes:
a NOx sensor self-diagnostic algorithm, stored on the tangible, non-transitory memory of the controller, configured to detect each of the occurrence of a regeneration event of the particulate filter within the vehicle key cycle and the non-occurrence of a regeneration event of the particulate filter within the vehicle key cycle; and
a NOx sensor self-diagnostic tool, stored on the tangible non-transitory memory of the controller, configured to evaluate each of the first evaluation element of the upstream NOx sensor and the second evaluation element of the downstream NOx sensor and generate a diagnostic output, such that the diagnostic output represents a condition of each of the first evaluation element and the second evaluation element; and
an engine control module configured to initiate the engine after-run state and signal the NOx sensor self-diagnostic tool to evaluate each of the first evaluation element and second evaluation element during the engine after-run state.

3. The vehicle of claim 2 wherein disabling the engine after-run state includes disabling the NOx sensor self-diagnostic tool with the engine control module.

4. The vehicle of claim 2 wherein the engine control module signals the initiation of the engine after-run state when the engine is running.

5. The vehicle of claim 4 wherein the glow plug control module supplies power to each of the upstream NOx sensor, the downstream NOx sensor, and the engine control module during the engine after-run state.

6. The vehicle of claim 5 wherein initiating the engine after-run state includes:
transmitting a predetermined calibrated amount of engine after-run extension time to the glow plug control module with the engine control module while the engine is running;
supplying power to each of the upstream NOx sensor, the downstream NOx sensor, and the powertrain expansion bus, with the glow plug control module, for the predetermined calibrated amount of after-run extension time when the engine is turned off;
signaling the NOx sensor self-diagnostic tool to evaluate each of the first evaluation element of the upstream NOx sensor and the second evaluation element of the downstream NOx sensor during the predetermined calibrated amount of engine after-run extension time; and
generating the diagnostic output with the NOx sensor self-diagnostic tool and transmitting the diagnostic output to the engine control module over the powertrain expansion bus.

7. The vehicle of claim 6 wherein initiating the engine after-run state further includes:
determining a status of the diagnostic output as one of a passing result and a failing result with the engine control module;
returning a result to the controller with the engine control module, wherein the result is one of a passing result and a failing result; and
ending the engine after-run state by shutting down each of the engine control module, the glow plug control module, and each of the first and second NOx sensors when the predetermined calibrated amount of engine after-run extension time expires.

8. The vehicle of claim 6 wherein the NOx sensor self-diagnostic tool runs for a predetermined diagnostic tool duration; and wherein the duration of the predetermined calibrated amount of engine after-run extension time is about three times the predetermined diagnostic tool duration.

9. The vehicle of claim 8 wherein the predetermined diagnostic tool duration is approximately 12 seconds.

10. The vehicle of claim 8 wherein the predetermined calibrated amount of engine after-run extension time is less than one minute.

11. A vehicle comprising:
an internal combustion engine configured to generate an exhaust stream;
an exhaust system including:
a selective catalytic reduction (SCR) device configured to catalytically convert nitrogen oxide (NOx) gases present in the exhaust stream into water and nitrogen;
an upstream NOx sensor having a first evaluation element configured to measure an upstream NOx level on an inlet side of the SCR device; and
a downstream NOx sensor having a second evaluation element configured to measure a downstream NOx level on an outlet side of the SCR device;
a particulate filter configured to remove particulate matter from the exhaust stream;
a powertrain expansion bus in communication with the exhaust system; and
a controller in communication with the upstream and downstream NOx sensors, the controller having a processor and tangible, non-transitory memory on which is recorded instructions, wherein executing the recorded instructions causes the processor to:
detect each of an occurrence of a regeneration event of the particulate filter within a vehicle key cycle and a non-occurrence of a regeneration event of the particulate filter within the vehicle key cycle;
execute a first control action when an occurrence of a regeneration event of the particulate filter is detected within the vehicle key cycle, wherein the first control action includes:
evaluating an amount of time elapsed since the occurrence of a regeneration event of the particulate filter to produce an evaluated amount of time; and
comparing the evaluated amount of time to a predetermined calibration threshold amount of time elapsed since the occurrence of a regeneration event of the particulate filter, such that when the evaluated amount of time is greater than the predetermined calibration threshold amount of time elapsed since the occurrence of a regeneration event of the particulate filter the controller initiates a second control action and when the evaluated amount of time is less than the predetermined calibration threshold amount of time elapsed since the occurrence of a regeneration event of the particulate filter the controller disables an engine after-run state; and
execute the second control action when a non-occurrence of a regeneration event of the particulate filter is detected within the vehicle key cycle, wherein the second control action includes initiating the engine after-run state.

12. The vehicle of claim 11 wherein the controller includes:
a NOx sensor self-diagnostic algorithm, stored on the tangible, non-transitory memory of the controller, configured to detect each of the occurrence of a regeneration event of the particulate filter within the vehicle key cycle and the non-occurrence of a regeneration event of the particulate filter within the vehicle key cycle; and
a NOx sensor self-diagnostic tool, stored on the tangible non-transitory memory of the controller, configured to evaluate each of the first evaluation element of the upstream NOx sensor and the second evaluation element of the downstream NOx sensor and generate a diagnostic output, such that the diagnostic output represents a condition of each of the first evaluation element and the second evaluation element; and
an engine control module configured to initiate the engine after-run state and signal the NOx sensor self-diagnostic tool to evaluate each of the first evaluation element and second evaluation element during the engine after-run state.

13. The vehicle of claim 12 wherein the engine control module signals the initiation of the engine after-run state when the engine is running.

14. The vehicle of claim 12 wherein disabling the engine after-run state includes disabling the NOx sensor self-diagnostic tool with the engine control module.

15. The vehicle of claim 14 wherein initiating the engine after-run state includes:
determining, with the engine control module, a predetermined amount of engine after-run extension time;
signaling the NOx sensor self-diagnostic tool to evaluate each of the first evaluation element of the upstream NOx sensor and the second evaluation element of the downstream NOx sensor during the predetermined calibrated amount of engine after-run extension time; and
generating the diagnostic output with the NOx sensor self-diagnostic tool and transmitting the diagnostic output to the engine control module over the powertrain expansion bus.

16. The vehicle of claim 15 wherein initiating the engine after-run state further includes:
- determining a status of the diagnostic output as one of a passing result and a failing result with the engine control module;
- returning a result to the controller with the engine control module, wherein the result is one of a passing result and a failing result; and
- ending the engine after-run state by shutting down each of the engine control module and each of the first and second NOx sensors when the predetermined calibrated amount of engine after-run extension time expires.

17. The vehicle of claim 15 wherein the NOx sensor self-diagnostic tool runs for a predetermined diagnostic tool duration; and wherein the duration of the predetermined calibrated amount of engine after-run extension time is about three times the predetermined diagnostic tool duration.

* * * * *